(12) United States Patent
Kordel et al.

(10) Patent No.: US 7,387,277 B2
(45) Date of Patent: Jun. 17, 2008

(54) AIRCRAFT WING COMPOSED OF COMPOSITE AND METAL PANELS

(75) Inventors: Jan A. Kordel, Redmond, WA (US); Richard B. Tanner, Seattle, WA (US); Ian C. Burford, Duvall, WA (US); Victor A. Munsen, Woodinville, WA (US); Daniel E. McGinty, Redmond, WA (US); Scott N. Rampton, Bothell, WA (US); Bruce R. Fox, Everett, WA (US); James M. Kelly, Marysville, WA (US); Miles O. Johnson, Brier, WA (US)

(73) Assignee: The Boeing Company, Chicago, IL (US)

( * ) Notice: Subject to any disclaimer, the term of this patent is extended or adjusted under 35 U.S.C. 154(b) by 490 days.

(21) Appl. No.: 11/027,570

(22) Filed: Dec. 29, 2004

(65) Prior Publication Data

US 2008/0023585 A1  Jan. 31, 2008

(51) Int. Cl.
*B64C 3/20* (2006.01)
(52) U.S. Cl. .................................................. 244/123.5
(58) Field of Classification Search ................. 244/123, 244/131, 123.5
See application file for complete search history.

(56) References Cited

U.S. PATENT DOCUMENTS

| | | | |
|---|---|---|---|
| 4,542,866 A | 9/1985 | Caldwell et al. | |
| 4,749,155 A * | 6/1988 | Hammer et al. | 244/123.7 |
| 4,836,470 A | 6/1989 | Criswell | |
| 4,880,189 A * | 11/1989 | Day | 244/214 |
| 5,154,370 A | 10/1992 | Cox et al. | |
| 5,216,799 A | 6/1993 | Charnock et al. | |
| 5,332,178 A | 7/1994 | Williams | |
| 5,496,002 A | 3/1996 | Schutze | |
| 5,735,486 A | 4/1998 | Piening et al. | |
| 5,806,798 A * | 9/1998 | Gillandt et al. | 244/123.7 |
| 5,829,716 A * | 11/1998 | Kirkwood et al. | 244/117 R |
| 5,924,649 A | 7/1999 | Piening et al. | |

(Continued)

FOREIGN PATENT DOCUMENTS

EP   0732262 A2   9/1996

(Continued)

OTHER PUBLICATIONS

PCT Intl Search Report and Written Opinion for Application No. PCT/US2006/001017, dated Jul. 24, 2007, 14 pgs.

*Primary Examiner*—Timothy D. Collins
(74) *Attorney, Agent, or Firm*—Lee & Hayes, PLLC

(57) ABSTRACT

Aircraft wing assemblies having both composite and metal panels are disclosed. In one embodiment, a wing assembly includes a support structure, an upper panel assembly formed from a metal material and coupled to the support structure, and a lower panel assembly formed from a composite material and coupled to the support structure. The metal material may be aluminum, titanium, or any other suitable metal, and the composite material may be a carbon fiber reinforced plastic (CFRP) material or other suitable composite material. In another embodiment, the upper panel assembly includes a downwardly depending first web portion, and the lower panel assembly includes an upwardly depending second web portion, the second web portion being proximate the first web portion, and an interface member of an isolating material is disposed between the first and second web portions.

25 Claims, 5 Drawing Sheets

U.S. PATENT DOCUMENTS

| | | |
|---|---|---|
| 6,190,484 B1 | 2/2001 | Appa |
| 6,237,873 B1 | 5/2001 | Amaoka et al. |
| 6,375,120 B1* | 4/2002 | Wolnek .................. 244/123.8 |
| 6,475,320 B1 | 11/2002 | Masugi |
| 6,513,757 B1 | 2/2003 | Amaoka et al. |
| 6,638,466 B1* | 10/2003 | Abbott ...................... 264/238 |
| 6,745,979 B1 | 6/2004 | Chen |
| 6,776,371 B2* | 8/2004 | Tanaka et al. ........... 244/117 R |
| 6,849,323 B2 | 2/2005 | Benson et al. |
| 2002/0195524 A1* | 12/2002 | Amaoka et al. ............. 244/123 |
| 2003/0226935 A1* | 12/2003 | Garratt et al. .............. 244/123 |
| 2004/0124311 A1* | 7/2004 | Kordel et al. ............... 244/131 |

FOREIGN PATENT DOCUMENTS

| | | |
|---|---|---|
| EP | 1070661 A2 | 1/2001 |

* cited by examiner

AIRCRAFT WING COMPOSED OF COMPOSITE AND METAL PANELS

FIELD OF THE INVENTION

This invention relates to aircraft wing assemblies, and more specifically, to aircraft wing assemblies having both composite and metal panels.

BACKGROUND OF THE INVENTION

Wing assemblies of conventional modern commercial aircraft generally include a wing box made from aluminum panels, spars, and ribs. Although desirable results have been achieved using prior art wing assemblies, there may be room for improvement. For example, the reduction of structural weight of an aircraft generally equates to better airplane performance. With respect to commercial aircraft, such improved performance has value in the marketplace. Composite materials have been examined as an alternative to aluminum, however, composite materials are generally expensive in comparison with aluminum, and may not be well suited for carrying high compressive loads experienced in certain circumstances.

SUMMARY OF THE INVENTION

The present invention is directed to aircraft wings having both composite and metal panels. Embodiments of methods and systems in accordance with the present invention may advantageously provide substantial weight savings, more robust lightning/EME protection characteristics, better discreet source damage tolerance characteristics, and improved cost over competing prior art wing assemblies.

In one embodiment, a wing assembly includes a support structure having a first end portion adapted to be coupled to an aircraft, an upper panel assembly formed from a metal material and coupled to the support structure, and a lower panel assembly formed from a composite material and coupled to the support structure. The metal material may be aluminum, titanium, or any other suitable metal, and the composite material may be a carbon fiber reinforced plastic (CFRP) material or other suitable composite material. In an alternate embodiment, the upper panel assembly includes a downwardly depending first web portion positioned proximate the first end portion of the support structure, and the lower panel assembly includes an upwardly depending second web portion, the second web portion being proximate the first web portion, the wing assembly further comprising an interface member of an isolating material disposed between the first and second web portions, and at least one fastener coupling the second web portion, the interface member, and the first web portion to the support structure.

BRIEF DESCRIPTION OF THE DRAWINGS

Preferred and alternate embodiments of the present invention are described in detail below with reference to the following drawings.

DETAILED DESCRIPTION

The present invention relates to wing assemblies for aircraft having both composite and metal panels. Many specific details of certain embodiments of the invention are set forth in the following description and in FIGS. 1-5 to provide a thorough understanding of such embodiments. One skilled in the art, however, will understand that the present invention may have additional embodiments, or that the present invention may be practiced without several of the details described in the following description.

In general, embodiments of the present invention provide wing assemblies having both composite and aluminum panels. Certain composite materials, including carbon fiber reinforced plastic (CFRP) materials, perform well in tension and resist fatigue damage. Aluminum has relatively good compression properties but relatively lower tensile and fatigue performance. Thus, wing assemblies that include composite panels in areas that primarily experience tensile loads, and aluminum panels in other areas that primarily experience compression loads, may provide substantial weight reduction in comparison with prior art wing assemblies, and may provide a wing assembly that is lighter than either a fully aluminum built wing assembly or a full CFRP wing assembly.

A number of distinct complexities are encountered in the development of embodiments of wing assemblies having both CFRP panels and aluminum panels, including 1) galvanic corrosion at CFRP/aluminum interfaces, 2) different rates of thermally induced expansion and 3) incompatible strain limits of aluminum and CFRP. These areas of concern are addressed in the present disclosure, and have been at least partially mitigated by embodiments of the present invention, as described more fully below.

Figure 1:
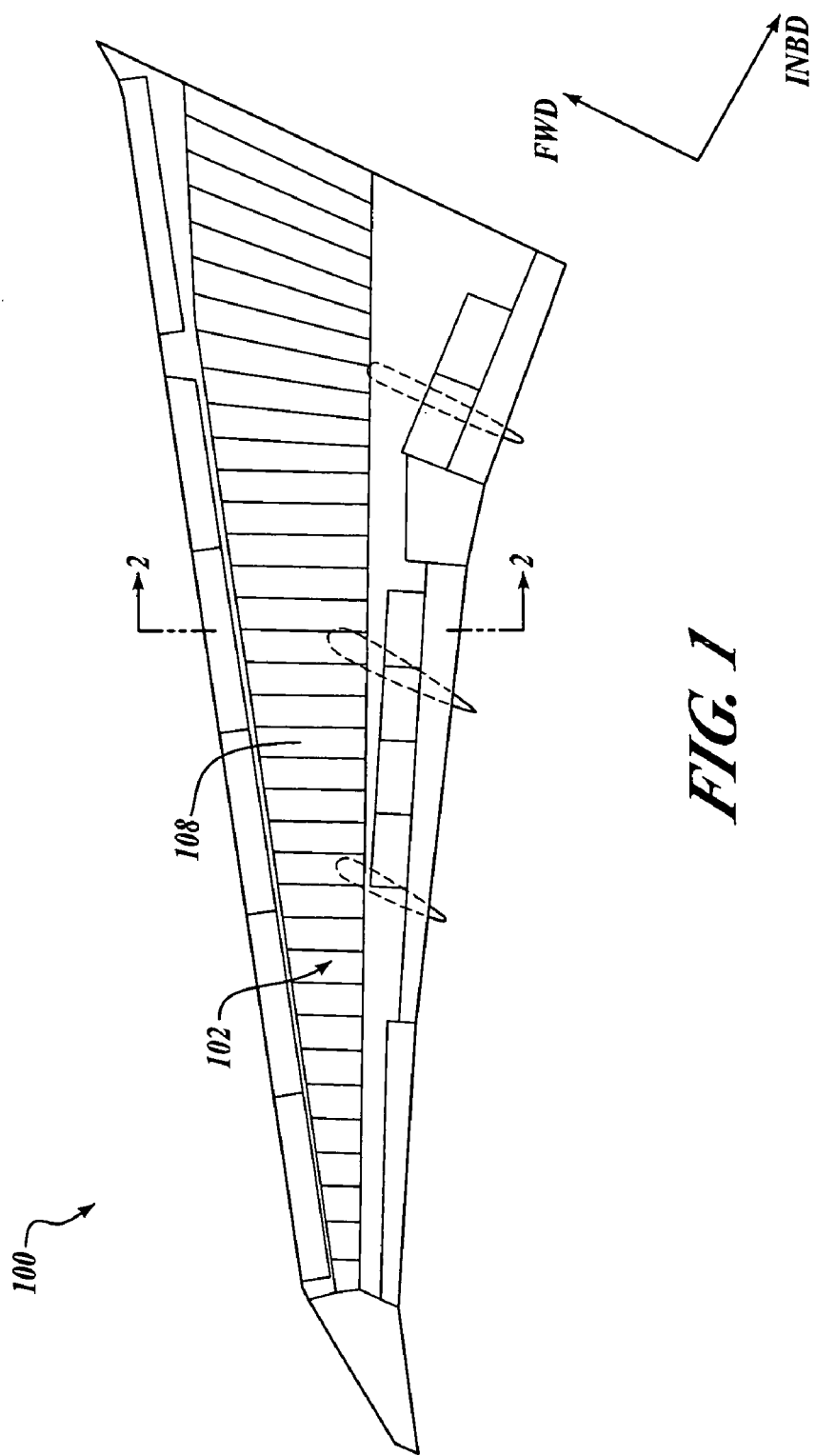
FIG. 1 is a top elevational view of a wing assembly in accordance with an embodiment of the invention.
Figure 2:
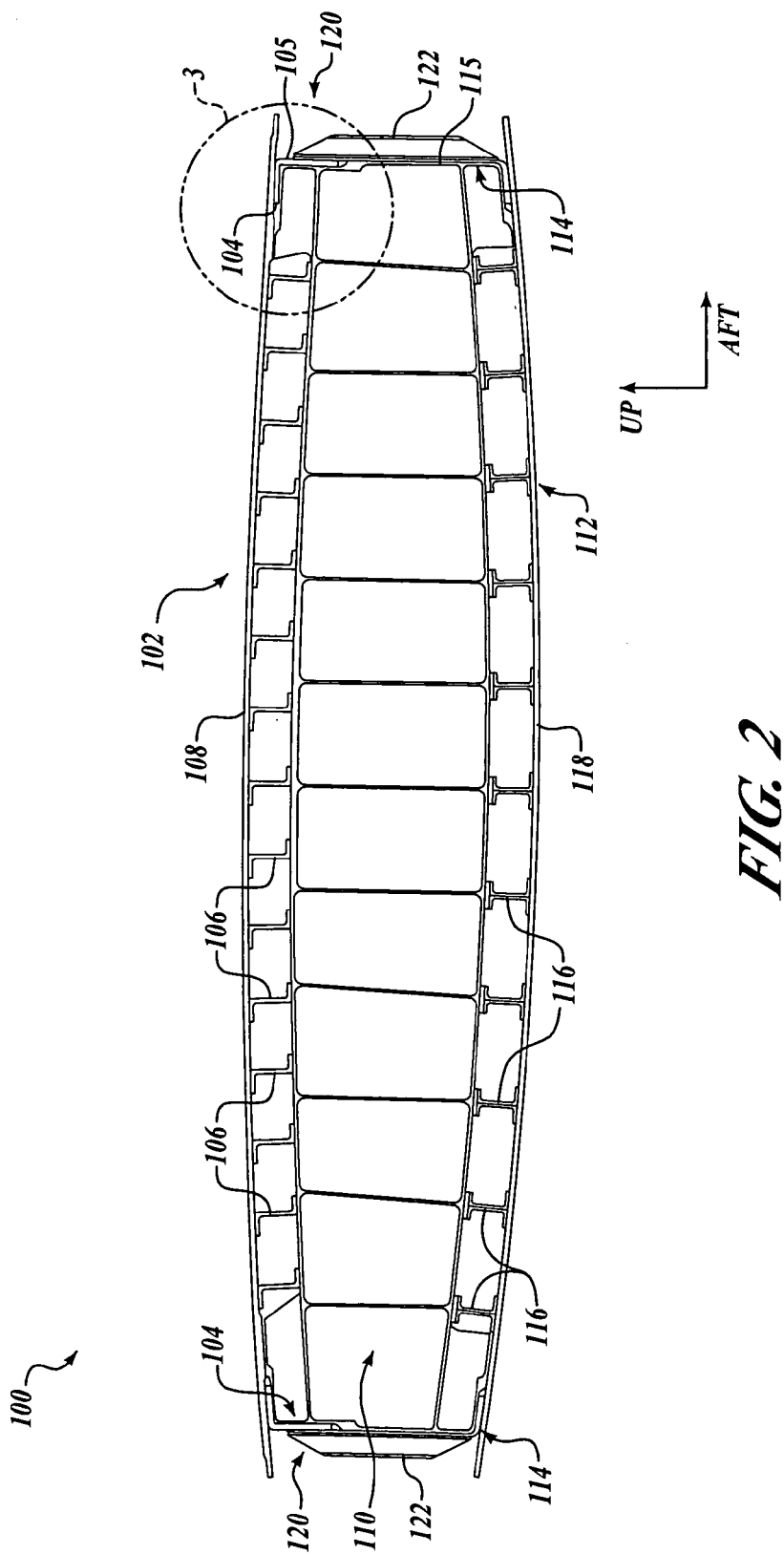
FIG. 2 is an end cross-sectional view of the wing assembly of FIG. 1 taken along line 2-2.

FIG. 1 is a top elevational view of a wing assembly 100 in accordance with an embodiment of the invention. FIG. 2 is an end cross-sectional view of the wing assembly 100 of FIG. 1 taken along line 2-2. In this embodiment, the wing assembly 100 includes an upper panel assembly 102, and upper spar chords 104. In a presently-preferred embodiment, the upper panel assembly 102 and the upper spar chords 104 are formed from aluminum or other suitable metal material, such as titanium. Similarly, the wing assembly 100 includes a lower panel assembly 112 and lower spar chords 114. In one embodiment, the lower panel assembly 112 and the lower spar chords 114 are formed from a composite material, such as, for example, a CFRP.

As shown in FIG. 2, the upper panel assembly 102 includes an upper skin 108 and a plurality of upper web members 106. The web members 106 couple the upper skin 108 to a support structure 110 of the wing assembly 100. Similarly, the lower panel assembly 112 includes a lower skin 118 and a plurality of lower web members 116 that couple the lower skin 118 to the support structure 110.

Figure 3:
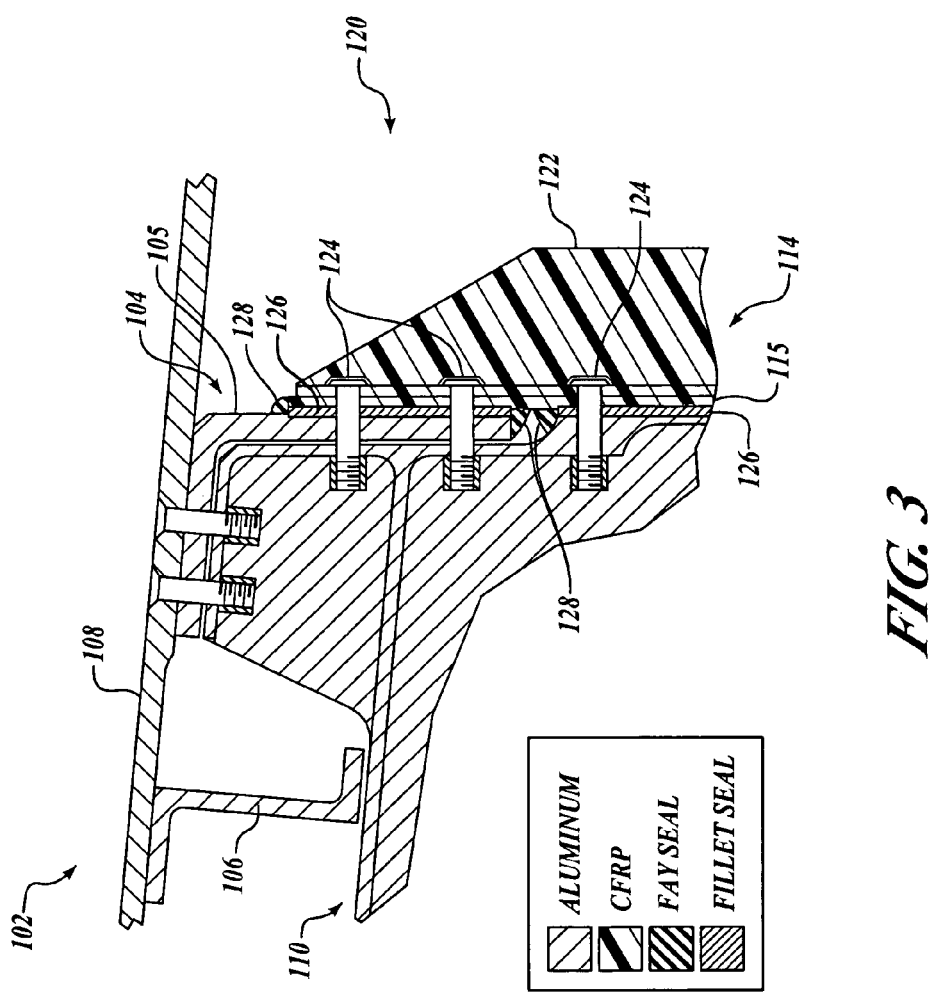
FIG. 3 is an enlarged elevational view of an interface portion in accordance with an embodiment of the invention.

A pair of interface portions 120 situated at opposing ends of the support structure 110 couple each of the upper spar chords 104 to the lower spar chords 114. More specifically, as best shown in FIG. 3, the lower spar chord 114 includes a web portion 115 that extends upwardly to overlap with a downwardly extending web portion 105 of the upper spar chord 104. A rib member 122 extends upwardly along the web portions 105, 115 of the upper and lower spar chords 104, 114. An interface member 126 is disposed between the web portion 115 of the lower spar chord 114 and the web portion 105 of the upper spar chord 104, and also between the web portion 115 of the lower spar chord 114 and the support structure 110. In one embodiment, the interface member 126 is a fiberglass isolation ply material. A plurality of fasteners 124 pass through the rib portion 122, one or more of the web portions 105, 115 of the upper and lower spar chords 104, 114, and the interface member 126, securing these components to the support structure 110. In one embodiment, the fasteners 124 are titanium bolts. A plurality of fillet seal members 128 are disposed at various edges and intersections where a metal component (e.g. the upper spar chord 104 and the support structure 110) is adjacent to or sufficiently proximate to a composite component (e.g. the lower spar chord 114).

In one particular embodiment, to prevent galvanic corrosion of the metallic upper spar chord 104, the following features are incorporated: (1) the interface member 126 isolates the web portion 115 of the lower spar chord 114 from the web portion 105 of the upper spar chord 104, (2) the upper spar chord 104 is coated with one or more coats of a non-electrically conducting material, (3) the interface portion 120 is coated with a thin layer of sealant, and (4) the fasteners 124 are installed with a wet sealant, with insulative collars (not shown) on the side proximate the upper spar chord 104. In a further embodiment, the heads of the fasteners 124 may be cap sealed and the collars may be self-sealing. By ensuring that the composite materials are physically isolated from the metal materials, and by preventing the ingress of moisture at the interfaces, the threat of galvanic corrosion may be reduced or eliminated. Furthermore, the location of the interface portion 120 in an upper portion of the wing assembly 100 may serve to keep the joint out of any pooling moisture.

Composite materials (e.g. CFRP materials) and metal materials (e.g. aluminum) may exhibit significantly different rates of thermally-induced strain. Thus, a metallic upper panel assembly 102 attached to a composite material lower panel assembly 112 subject to thermal cycling will exhibit bending strains (tip up when cooled and tip down when heated). Swept wing aircraft will also experience wing twist as a geometric result of the thermal bending. This wing twist can be mitigated with non-swept wing configurations. The thermal loading must be accounted for in both static and fatigue evaluation of the wing box. These loads are generally additive to the mechanical loads.

Figure 4:
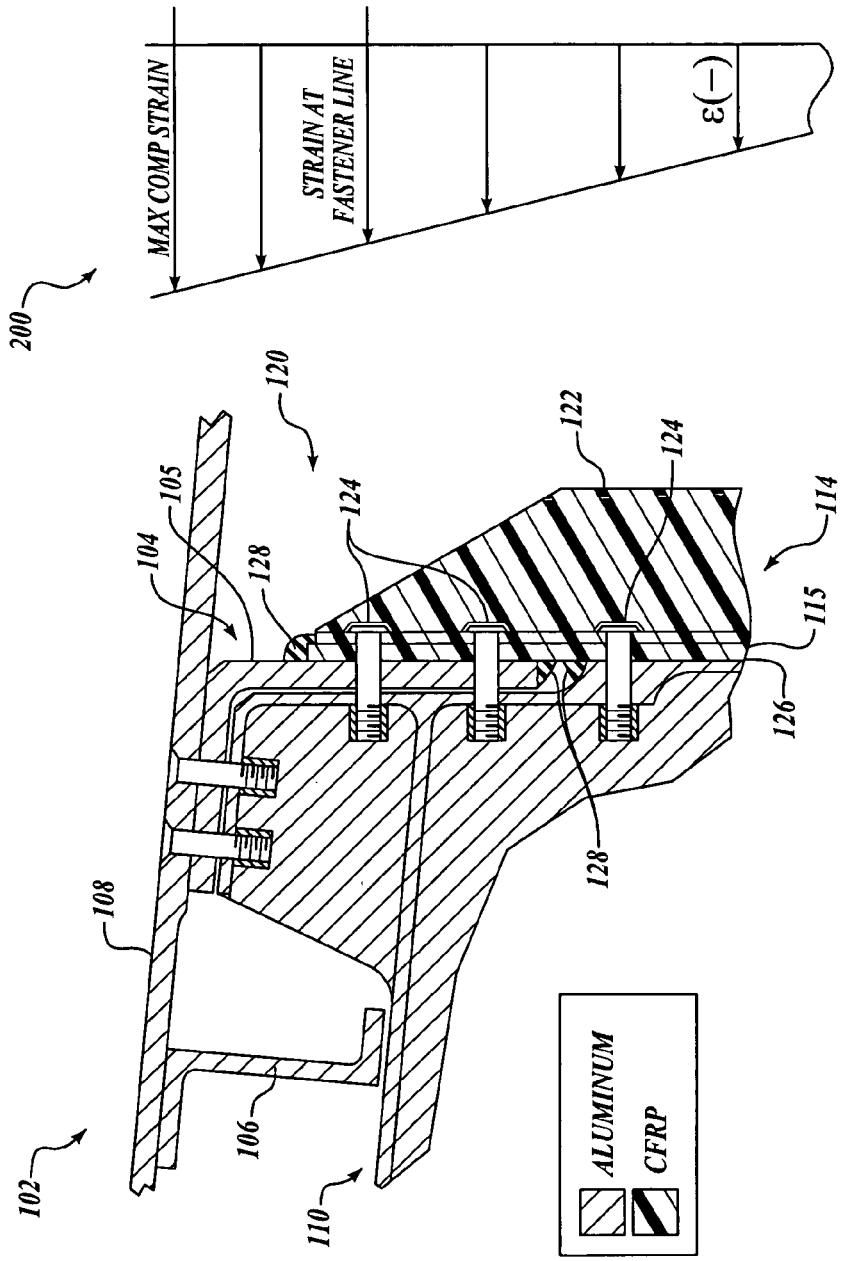
FIG. 4 is a strain gradient of the interface portion of FIG. 3.

FIG. 4 is a strain gradient 200 of the interface portion 120 of FIG. 3. In one particular embodiment, where the upper panel assembly 102 is formed from aluminum and the lower panel assembly 112 is formed from a presently-preferred CFRP composite material, the compression axial strain limit for aluminum is about 0.007 in/in while the strain limit for the presently-preferred composite including CFRP fibers loaded axially in compression is approximately 0.005 in/in. Thus, if the aluminum upper panel assembly 102 was attached to the CFRP lower panel assembly 112 at the area of maximum stress, the design of the aluminum panel would be limited by the strain cutoff of the CFRP and weight savings would not be achieved. FIG. 4 shows that by attaching the two materials of the upper and lower spar chords 104, 114 that the peak CFRP axial strain is reduced appreciably at the joint. Further enhancement of the strain compatibility can be made by omission of axial fibers from the lower spar chord 114 (and the rib portion 122) in the area of high compressive axial strain. Thus, the two materials can be used in bending and still achieve the higher aluminum strain levels (and thus reducing weight). It will be appreciated that it may be desirable to locate the attachment of the two materials on the web portions 105, 115 of the upper and lower spar chords 104, 114 (i.e. closer to the neutral axis of the wing box), allowing the aluminum upper panel assembly 102 to realize its full strain potential while maintaining strain compatibility at the material interface. The thermal induced fatigue loads at the joint are also less due the location of the joint relative to the neutral axis.

Embodiments of the present invention may provide advantages over the prior art. For example, by configuring a wing box as described above, substantial weight savings may be realized. In some embodiments, it may be possible to achieve a weight savings such that embodiments of the present invention are lighter than an entirely-composite material (e.g. CFRP) wing box, and approximately 20% lighter than an all aluminum wing box. Additional benefits may include providing more robust lightning/EME protection characteristics than an entirely-composite material wing designs, and better discreet source damage tolerance than competing entirely-composite material concepts. Integration of the nacelle, side of body and main landing gear may also be simplified using embodiments of the present invention compared with an entirely-composite material design. An additional benefit is the cost advantage of the embodiments of the present invention compared to an entirely-composite material wing box design.

Figure 5:
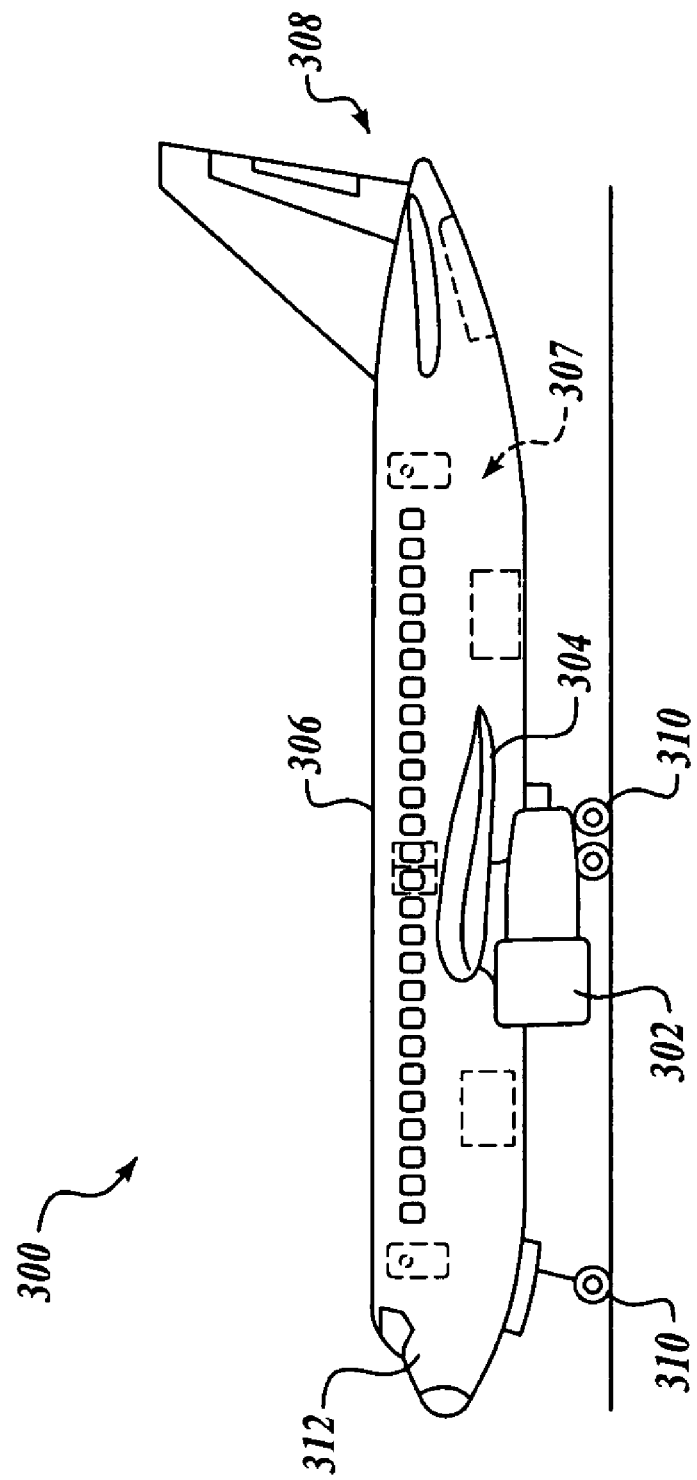
FIG. 5 is a side elevation view of an aircraft having wing assemblies in accordance with another embodiment of the invention.

Embodiments of wing assemblies in accordance with the present invention may be used in a wide variety of different flight vehicles. For example, FIG. 5 shows a side elevation view of an aircraft 300 having a pair of wing assemblies 304 in accordance with another embodiment of the present invention. The aircraft 300 generally includes one or more propulsion units 302 that are coupled to the wing assemblies 304, or alternately, to a fuselage 306, an airframe 307 disposed within the fuselage 306, or even other portions of the aircraft 300. Additionally, the aircraft 300 also includes a tail assembly 308 and a landing assembly 310 coupled to the fuselage 306 and/or to the airframe 307. The aircraft 300 further includes a variety of other systems and subsystems generally required for the proper operation of the aircraft 300. For example, the aircraft 300 includes a flight control system 312, as well as a plurality of other electrical, mechanical and electromechanical systems that cooperatively perform a variety of tasks necessary for the operation of the aircraft 300.

Although the aircraft 300 shown in FIG. 3 is generally representative of a commercial passenger aircraft, including, for example, the 737, 747, 757, 767 and 777 commercial passenger aircraft available from The Boeing Company of Chicago, Ill., in alternate embodiments, the present invention may also be incorporated into flight vehicles of other types. Examples of such flight vehicles may include manned or unmanned military aircraft, rotary wing aircraft, missiles, rockets, or ballistic flight vehicles, as illustrated more fully in various descriptive volumes, such as Jane's All The World's Aircraft, available from Jane's Information Group, Ltd. of Coulsdon, Surrey, UK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A wing assembly for use on an aircraft, comprising:
   a support structure having a first end portion configured to be coupled to the aircraft;
   an upper panel assembly formed from a metal material and coupled to the support structure;
   a lower panel assembly formed from a composite material and coupled to the support structure; and
   wherein the upper panel assembly includes a downwardly depending first web portion positioned proximate the first end portion of the support structure, and the lower panel assembly includes an upwardly depending second web portion, the second web portion being proximate the first web portion, the wing assembly further comprising an interface member of an isolating material disposed between the first and second web portions, and at least one fastener coupling the second web portion, the interface member, and the first web portion to the support structure.

2. The wing assembly of claim 1, wherein the metal material includes at least one of aluminum and titanium, and wherein the composite material includes a carbon fiber reinforced plastic (CFRP) material.

3. The wing assembly of claim 1, further comprising a rib member extending along and coupled to at least one of the first and second web portions.

4. The wing assembly of claim 1, wherein the upper panel assembly includes an upper spar chord proximate the first end of the support structure, the first web portion being a portion of the upper spar chord, and wherein the lower panel assembly includes a lower spar chord, the second web portion being a portion of the lower spar chord.

5. The wing assembly of claim 1, wherein the upper panel assembly includes a first skin coupled to the support structure by a plurality of first web members, and the lower panel assembly includes a second skin coupled to the support structure by a plurality of second web members.

6. The wing assembly of claim 1, further comprising at least one fillet seal disposed on at least one edge portion of at least one of the first and second web portions.

7. The wing assembly of claim 1, wherein the interface member is formed of a fiberglass isolating ply material.

8. The wing assembly of claim 1, wherein the interface member is formed of a material that prevents galvanic corrosion of the upper panel assembly.

9. The wing assembly of claim 1, wherein the downwardly depending first web portion is coated with one or more coats of a non-electrically conducting material.

10. A wing assembly for use on an aircraft, comprising:
a support structure having a first end portion configured to be coupled to the aircraft;
an upper panel assembly coupled to an upper portion of the support structure and having a downwardly-depending member formed from a metal material;
a lower panel assembly coupled to a lower portion of the support structure and having an upwardly-depending member formed from a composite material, the upwardly-depending member being coupled to the downwardly-depending member; and
at least one interface member disposed between the downwardly-depending member and the upwardly-depending member.

11. The wing assembly of claim 10, wherein the metal material includes at least one of aluminum and titanium, and wherein the composite material includes a carbon fiber reinforced plastic (CFRP) material.

12. The wing assembly of claim 10, wherein the upper panel assembly is formed entirely from a metal material.

13. The wing assembly of claim 10, wherein the lower panel assembly is formed entirely from a composite material.

14. The wing assembly of claim 10, wherein the at least one interface member is formed of a non-conductive material.

15. A wing assembly for use on an aircraft, comprising:
a support structure having a first end portion adapted to be coupled to the aircraft;
an upper panel assembly having an upper skin coupled to the support structure and including a downwardly depending first web portion positioned proximate the first end portion of the support structure, the first web portion being formed from a metal material;
a lower panel assembly having a lower skin coupled to the support structure and including an upwardly depending second web portion formed from a composite material, the second web portion being proximate the first web portion;
an interface member of an isolating material disposed between the first and second web portions; and
at least one fastener coupling the second web portion, the interface member, and the first web portion to the support structure.

16. The wing assembly of claim 15, wherein the metal material includes at least one of aluminum and titanium, and wherein the composite material includes a carbon fiber reinforced plastic (CFRP) material.

17. The wing assembly of claim 15, wherein the upper panel assembly is formed entirely from a metal material.

18. The wing assembly of claim 15, wherein the lower panel assembly is formed entirely from a composite material.

19. The wing assembly of claim 15, further comprising at least one fillet seal disposed on at least one edge portion of at least one of the first and second web portions.

20. The wing assembly of claim 15, wherein the interface member is formed of a fiberglass isolating ply material.

21. An aircraft, comprising:
a fuselage having an airframe;
a propulsion system operatively coupled to at least one of the fuselage and the airframe; and
at least one wing assembly including:
a support structure having a first end portion coupled to at least one of the fuselage and the airframe;
an upper panel assembly coupled to an upper portion of the support structure and having a downwardly-depending member formed from a metal material;
a lower panel assembly coupled to a lower portion of the support structure and having an upwardly-depending member formed from a composite material, the upwardly-depending member being coupled to the downwardly-depending member; and
wherein the upper panel assembly includes the downwardly depending member positioned proximate the first end portion of the support structure and the lower panel assembly includes the upwardly depending member, the upwardly depending member being proximate the downwardly depending member, the wing assembly further comprising an interface member of an isolating material disposed between the upwardly depending member and the downwardly depending member, and at least one fastener coupling the downwardly depending member, the interface member, and the upwardly depending member to the support structure.

22. The aircraft of claim 21, wherein the metal material includes at least one of aluminum and titanium, and wherein the composite material includes a carbon fiber reinforced plastic (CFRP) material.

23. The aircraft of claim 21, wherein the upper panel assembly includes an upper spar chord proximate the first end of the support structure, the first web portion being a portion of the upper spar chord, and wherein the lower panel assembly includes a lower spar chord, the second web portion being a portion of the lower spar chord.

24. The aircraft of claim 21, wherein the interface member is formed of a fiberglass isolating ply material.

25. The aircraft of claim 21, wherein the support structure is formed of a metal material.

* * * * *